(12) United States Patent
Beaudoin et al.

(10) Patent No.: US 8,175,020 B2
(45) Date of Patent: May 8, 2012

(54) METHOD FOR THE TRANSMISSION AND DISTRIBUTION OF DIGITAL TELEVISION SIGNALS

(75) Inventors: Scott Beaudoin, O'Fallon, MO (US); Scott Jones, Tulsa, OK (US); Scott Brillhart, Broken Arrow, OK (US); Michael Brown, University City, MO (US); Ryan Korte, Highland, IL (US)

(73) Assignee: Level 3 Communications, LLC, Broomfield, CO (US)

( * ) Notice: Subject to any disclaimer, the term of this patent is extended or adjusted under 35 U.S.C. 154(b) by 2445 days.

(21) Appl. No.: 10/769,465

(22) Filed: Jan. 30, 2004

(65) Prior Publication Data

US 2005/0169314 A1  Aug. 4, 2005

(51) Int. Cl.
| | |
|---|---|
| H04H 20/71 | (2008.01) |
| H04H 20/28 | (2008.01) |
| H04B 7/212 | (2006.01) |
| H04L 12/50 | (2006.01) |
| H04L 12/56 | (2006.01) |
| H04Q 11/00 | (2006.01) |
| H04J 3/16 | (2006.01) |
| H04J 3/22 | (2006.01) |
| H04J 1/00 | (2006.01) |
| H04J 3/06 | (2006.01) |
| H04J 3/00 | (2006.01) |
| H04M 1/64 | (2006.01) |
| H04M 11/00 | (2006.01) |

(52) U.S. Cl. ........ 370/312; 370/322; 370/358; 370/390; 370/391; 370/395.21; 370/466; 370/469; 370/486; 370/516; 370/521; 379/88.01; 379/93.08

(58) Field of Classification Search .................. 370/312, 370/322, 358, 390–391, 395.9, 466, 469, 370/486, 521; 379/88.1, 93.08
See application file for complete search history.

(56) References Cited

U.S. PATENT DOCUMENTS 5,343,240 A * 8/1994 Yu .............................. 348/14.01
(Continued)

FOREIGN PATENT DOCUMENTS

WO    WO-99/59335 A1    11/1999
(Continued)

OTHER PUBLICATIONS

Telecast to show new fiber-optic multiplexor at NAB2001, Jan. 29, 2001, http://www.digitalbroadcasting.com/article.mvc/Telecast-to-show-new-fiber-optic-multiplexer-0001?VNETCOOKIE=NO.*

(Continued)

*Primary Examiner* — Nishant B Divecha

(57) ABSTRACT

A system for the end-to-end delivery of digital television signals. In a preferred embodiment a digital television signal is: received from production equipment, typically in HD format at approximately 1.4 gigabits per second (Gbps); the received signal is transmitted to a venue point-of-presence; converted for transmission via a 270 Mbps local loop; transmitted to a fiber network point of presence/video service edge; packetized into TCP/IP packets in a video gateway; and routed to one or more destination addresses via the fiber network; received at one or more video service edge destinations; converted to a digital television format, typically SDI; and either transmitted via a second 270 Mbps local loop for delivery to a customer site and subsequent conversion to a 1.4 Gbps HD signal, or converted directly to a 1.4 Gbs HD signal at the receiving video service edge.

36 Claims, 7 Drawing Sheets

U.S. PATENT DOCUMENTS

| | | | | |
|---|---|---|---|---|
| 5,499,046 A * | 3/1996 | Schiller et al. | ............... | 725/146 |
| 5,577,042 A | 11/1996 | McGraw, Sr. et al. | | |
| 6,026,164 A * | 2/2000 | Sakamoto et al. | ............ | 380/217 |
| 6,028,639 A | 2/2000 | Bhatt et al. | ................ | 348/441 |
| 6,195,368 B1 | 2/2001 | Gratacap | ...................... | 370/535 |
| 6,292,490 B1 | 9/2001 | Gratacap et al. | ............. | 370/412 |
| 6,323,789 B1 * | 11/2001 | Lawrence | ................... | 341/102 |
| 6,351,471 B1 | 2/2002 | Robinett et al. | ............. | 370/468 |
| 6,351,474 B1 | 2/2002 | Robinett et al. | ............. | 370/486 |
| 6,498,667 B1 | 12/2002 | Masucci et al. | ............. | 359/157 |
| 6,519,693 B1 | 2/2003 | Debey | .......................... | 712/201 |
| 6,523,178 B1 | 2/2003 | Todogawa et al. | ............ | 725/151 |
| 6,532,562 B1 | 3/2003 | Chou et al. | ................... | 714/746 |
| 6,618,363 B1 | 9/2003 | Bahl | ............................. | 370/329 |
| 6,965,937 B2 * | 11/2005 | Gaddis et al. | ................ | 709/227 |
| 7,099,388 B2 * | 8/2006 | Cooper | .................... | 375/240.01 |
| 7,327,959 B2 * | 2/2008 | Pelletier et al. | .............. | 398/139 |
| 7,586,899 B1 * | 9/2009 | Mohaban et al. | ............. | 370/352 |
| 2001/0017667 A1 | 8/2001 | Frink et al. | .................... | 348/458 |
| 2002/0065938 A1 | 5/2002 | Jungck et al. | ................ | 709/246 |
| 2002/0130968 A1 | 9/2002 | Meyer | ....................... | 348/426.1 |
| 2003/0112338 A1 * | 6/2003 | Pelletier et al. | ......... | 348/211.99 |
| 2003/0128301 A1 * | 7/2003 | Tarr et al. | ..................... | 348/722 |
| 2003/0156218 A1 | 8/2003 | Laksono | | |
| 2003/0228093 A1 | 12/2003 | Notani | ............................ | 385/24 |
| 2004/0213160 A1 * | 10/2004 | Regan et al. | .................. | 370/248 |
| 2005/0114903 A1 * | 5/2005 | Ahmed et al. | ................ | 725/114 |
| 2007/0160142 A1 * | 7/2007 | Abrams, Jr. | ............. | 375/240.12 |

FOREIGN PATENT DOCUMENTS

| | | |
|---|---|---|
| WO | WO-02/080556 A1 | 10/2002 |
| WO | WO 03/005699 A | 1/2003 |

OTHER PUBLICATIONS

MPLS Base Transparent LAN Services, Oct. 28, 2002.*

Anonymous: "MPLS Based Transparent LAN Services". Riverstone Networks, 'Online! 2002, pp. 1-9, XP002319185.

ATSC: "Status of station implementations and interface standards required for successful transition to digital broadcasting". Advanced Television Systems Committee, 'Online! Jun. 24, 1998, pp. 1-92, XP002319187.

Holland, Gary: "Multi-Service Cable Network". Riverstone Networks, 'Online! 2002, pp. 1-15, XP002319189.

NTT: "i-Visto gateway". NNT, 'Online! Mar. 24, 2003, pp. 1-2, XP002319186.

Python: "Multichannel Fiber Optic HDTV/SDTV System". Telecast, 'Online! XP002319188.

Snell & Wilcox: "DTV Options for Transmission". Internet Article, 'Online! Oct. 26, 2001, pp. 1-8, XP002319184.

Canadian Examination Report, dated Jul. 19, 2010, Canadian Application No. 2,554,881 "Method for the Transmission and Distribution of Digital Television Signals".

"AASTRA : Wavestar Digital Video System", http://www.broadcast.harris.com/digital-video/pdf/wavestar-dvs_1.pdf [retrieved on Jan. 11, 2012] XP002666938, 24 pgs.

"European Search Report, dated Jan. 24, 2012", European App. No. 10189939.1, 13 pgs.

* cited by examiner

METHOD FOR THE TRANSMISSION AND DISTRIBUTION OF DIGITAL TELEVISION SIGNALS

BACKGROUND OF THE INVENTION

1. Field of the Invention

The present invention relates to a method for the transmission and distribution of digital television (DTV) signals. More particularly, but not by way of limitation, the present invention relates to a method for converting DTV signals to a format for transmission over a communication network, and transmitting the signal via the communication network to a remote location.

2. Background of the Invention

While the quest for high-definition television ("HDTV" or "HD") has been hampered by the lack of a single standard, resistance by the broadcast industry to implementation, and a substantial price disparity at the consumer level, mandates from the Federal Communication Commission are forcing broadcasters and equipment manufacturers to transition from conventional analog transmission to digital television transmission. These mandates are certain to finally usher in the era of DTV, improving the quality of standard definition television ("SDTV" or "SD") and advancing the cause of HDTV. As digital programming becomes more prevalent, the need for infrastructure for the production and distribution of digital programming becomes more pressing.

Most of the existing infrastructure was developed for the distribution of analog video, and an assortment of options presently exist as to the production and distribution of analog programming. Distribution via satellite, microwave link, or digitally through a fiber network, or even over conventional wires are common place. Arrangements can be made for a live broadcast from almost anywhere in the world with little more than a few hours notice. Unfortunately, while the video signal may be digitized over some portion of its path, it starts out as an analog signal and is delivered as an analog signal. End-to-end delivery of digital video is just beginning to evolve.

Presently, satellite transponders are available which will carry DTV signals, however the issue of bandwidth is, at best, confusing. Data rates vary widely from satellite-to-satellite and transponder sharing further complicates the issue. A producer who plans on sending a DTV signal via satellite must negotiate bandwidth as well as cost. Regardless of these issues, satellite bit rates for a single transponder are limited to roughly 100 Mbps. As a result, for satellite transmission of DTV, some form of compression is virtually always required. For transmission of HDTV signals via satellite, substantial compression is absolutely necessary. As discussed further hereinbelow, compression raises additional concerns.

Compression techniques can be broadly divided into two categories: 1) lossy techniques; and 2) non-lossy techniques. Generally speaking, lossy compression techniques compress a signal in a manner designed to faithfully reproduce the content at the receiving end while not faithfully recreating the original digital signal. Non-lossy compression techniques faithfully reproduce the original data stream, thus ensuring that the content at the receiving end is identical to that at the transmitting end. Lossy compression techniques have emerged as the standard simply because such schemes provide significantly higher rates of compression over their non-lossy counterparts. Many of the aggressive compression schemes employ forward interpolation which, in terms of video signals, means that the information displayed in the current video frame is at least partially dependent on information contained in one or more future video frames. The result is that these compression techniques, by necessity, add delay to the signal. In general terms, as the data rate increases, the amount of compression decreases and the adverse effects of compression, i.e. fidelity of the output relative to the input and delay, are reduced.

Thus, besides bandwidth and cost, a producer must also ensure a chosen transponder can accommodate the format of the compressed data stream and must determine if the accumulated delays are acceptable, including the transit time between the earth and satellite. The round trip distance from the earth to a satellite alone adds approximately a one-half second delay to a satellite relayed signal.

Like satellite transmissions, for the most part terrestrial infrastructure has been developed around analog video signals. While fiber networks are inherently digital in nature, bit rates offered to video programmers have been driven by traditional quality video. Simply providing more bandwidth to accommodate HDTV signals is hampered by any number of bottlenecks, such as: the data rate supported by the link between a venue and the fiber network, typically supplied by the local telephone company; the link between the fiber network and the receiving end; or even bandwidth limitations of various network elements. At many venues, the link between the venue and the fiber network is actually analog and digitization takes place at the fiber network point of presence. After digitization, even traditional analog video signals are sometimes compressed for digital transmission over the network. As with satellite transmissions, for a given video format, compressing the video signal reduces quality and introduces delay.

Another issue with transmission over terrestrial carriers is reaching multiple receivers. While satellites cover wide areas by their very nature, terrestrial video links tend to be point-to-point. While point-to-multipoint distribution is possible with either wire networks or fiber networks, a route to each receiver must be planned in advance. For live events, program production typically occurs at the venue, while commercials are added at a studio or fixed production facility. Thus the possibility exists that there may be a need for point-to-multipoint delivery both for the original feed from the venue and for the finished programming including commercials. With millions of dollars of revenue on the line, not only does such an event warrant the provisioning of dedicated routes in advance, but also the provisioning of redundant paths to avoid lost programming in the case of a network event such as a fiber cut.

Still another issue in producing and distributing television programming is monitoring the broadcast video, including commercials, at the venue. Even with analog programming, returning finished video to the production truck is problematic. If the finished video is transmitted to network affiliates via satellite, a satellite dish may be used at the venue to receive the signal. Alternatively, if the programming is carried by a local station, the signal can be monitored directly off-the-air. However, local programming may also include locally inserted commercials or content which overlaps the network programming. Yet another alternative is to provision identical infrastructure assets to return the programming as were used to transmit the original signal. This technique could effectively double the cost of distribution.

Yet another issue in the transmission of digital television signals is maintaining synchronization between video and audio portions of the signal. Generally speaking, the delays caused by distance and compression are substantially constant. Once the audio is synchronized to the video, it will stay synchronized. Problems with synchronization arise when the audio signal takes a different path from that of the video signal and the delay in one of the paths is variable, or when the delay introduced through compression is variable.

Thus it is an object of the present invention to provide a system and method for the end-to-end delivery of digital television signals.

Thus it is a further object of the present invention to provide a system and method for the end-to-end delivery of digital television signals with embedded, synchronized audio programming.

It is yet a further object of the present invention to provide a system and method for the end-to-end delivery of digital television signals in a point-to-multipoint environment.

It is yet a further object of the present invention to provide a system and method for the end-to-end delivery of digital television signals via a network conducive to automated provisioning of network resources for a given program.

SUMMARY OF THE INVENTION

The present invention provides a system for the end-to-end delivery of digital television signals. In a preferred embodiment a digital television signal is: received from production equipment, typically in HD format at approximately 1.4 gigabits per second (Gbps); the received signal is transmitted to a venue point-of-presence; converted for transmission via a local digital loop; transmitted to a network point of presence/ video service edge; packetized into data packets in a video gateway; and routed to one or more destination addresses via the data network; received at one or more video service edge destinations; converted to a digital television format, typically SDI; and either transmitted via a second local digital loop for delivery to a customer site and subsequent conversion to a 1.4 Gbps HD signal, or converted directly to a 1.4 Gbs HD signal at the receiving video service edge.

In another preferred embodiment TCP/IP packets are transmitted via dedicated routes which are determined and scheduled prior to the video transmission. Optionally, when finished programming is returned to the venue, a symmetric path can be provisioned for the returning program so that the need for duplicate dedicated network assets is reduced and to facilitate point-to-multipoint distribution.

In still another preferred embodiment audio information is encoded in TCP/IP packets and embedded with video traffic along the same network routes. When routes are determined in advanced and dedicated to carrying the video program, packets arrive in the same order as sent, thus ensuring the audio program remains synchronized with the video program.

In still another preferred embodiment television signals are digitally transmitted end-to-end from a venue to a customer site wherein at least a portion of the transmission takes place over a multi-protocol label switching ("MPLS") network. Preferably packetized video information enters the MPLS network through a label edge router which adds a label to each video packet containing routing information for the packet.

In yet another preferred embodiment, digital video information is carried over a data network wherein the egress node includes a memory buffer of sufficient length to remove jitter in the signal caused by routing delays.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Figure 1A:
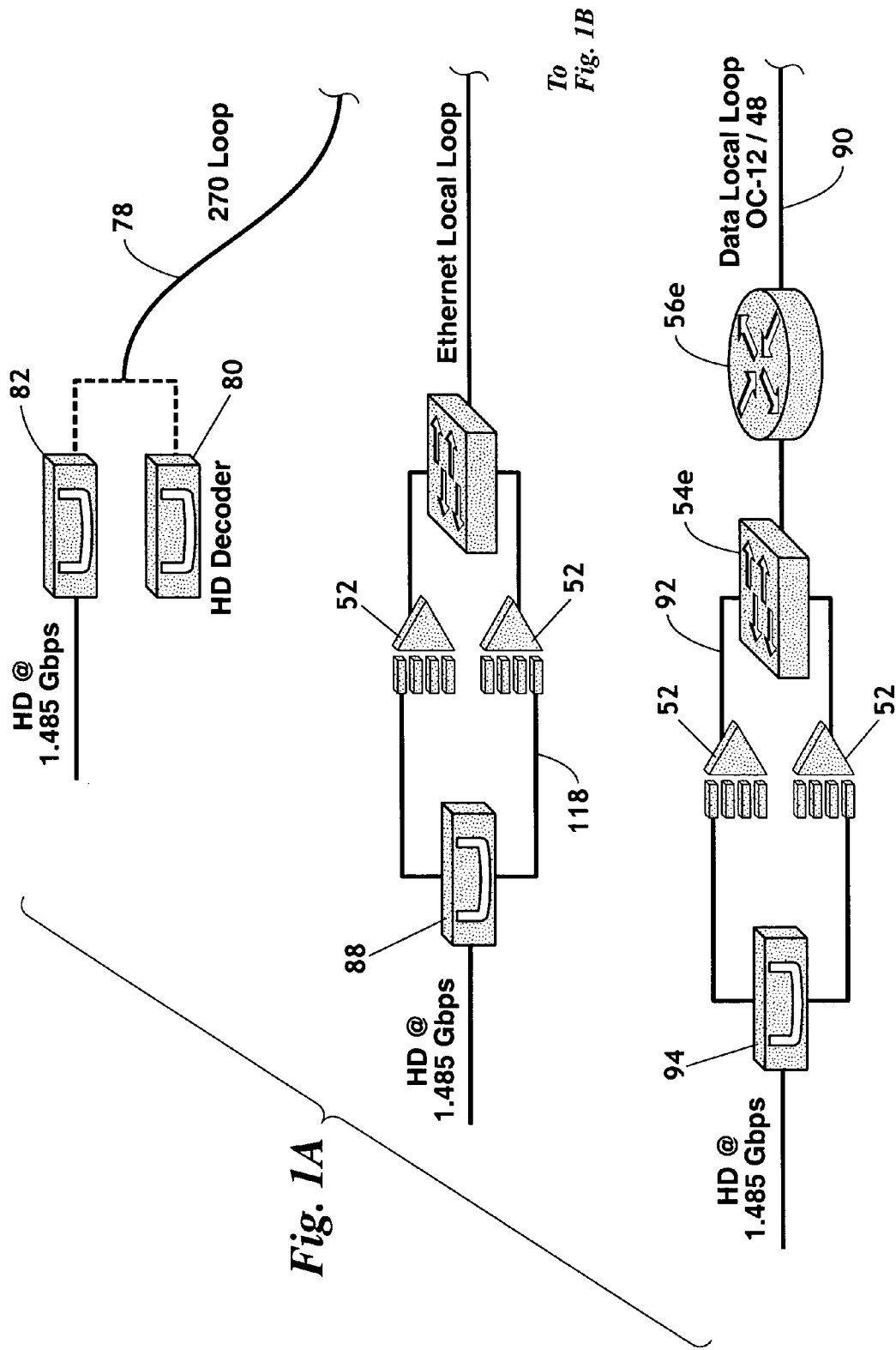
FIG. 1A provides a block diagram of preferred embodiments of digital video outputs at a customer site.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

As will become apparent on reading the description of the preferred embodiments, while the inventive system is not limited to a single network architecture, in the preferred embodiments DTV information is transmitted, at least in part, over a multiprotocol label switching ("MPLS") network. Such networks are well known in the art and, with the exception of specialty label ingress nodes and label egress nodes, as discussed further hereinbelow, the MPLS network of the present invention is conventional in nature.

In a MPLS network, packets are assigned a label at an ingress mode. In practical terms, the label defines a route through the network. At each node, the label provides an index into a routing table which provides the next network hop and a new label which is meaningful to the next node of the network. A number of options are available for label handling at each node. While MPLS networks are designed for fast routing, the inherent ability to designate and manage routes in advance of even the first packet of data is of particular interest to the present invention.

Referring now to the drawings, wherein like reference numerals indicate the same parts throughout the several views, a block diagram of the inventive system for transmitting DTV signals is shown in FIG. 1A-E. Beginning with FIG. 1D, digital video, typically HD video, is delivered from a production truck, or other video source, via conductor 20, which is may be either fiber or copper wire, typically carrying HD at a data rate of 1.485 Gbps. Typically the digital video stream will be in conformance with a published standard, such as SMPTE 292 as promulgated by the Society of Motion Picture and Television Engineers.

At a typical venue, conversions are performed at or near the production equipment. First, if the signal is received optically, the signal is converted to electrical by distribution amplifier 24. Next the HD signal is encoded at 270 Mbps by encoder 22 for transmission over cable 26, preferably in either SDI or ASI format. The conversion from HD to 270 Mbps allows the signal to negotiate throughput bottlenecks.

As will be appreciated by those skilled in the art, 270 Mbps is a standard SD data rate and is preferably in conformance with SMPTE 259M, or a similar published standard. Terms associated with 270 Mbps digital video include "serial data interface" ("SDI") which generally refers to data in conformance with SMPTE 259M and "asynchronous serial interface" ("ASI") which generally refers to digital video compressed according to the DVB standard.

As will also be appreciated by those skilled in the art, the HD-to-SD encoding and conversion from an optical data stream to an electrical data stream are known in the art. One such system for performing these operations is the model 7700 HD series available from Evertz Microsystems, Ltd. of Burlington, Ontario, Canada.

Figure 2:
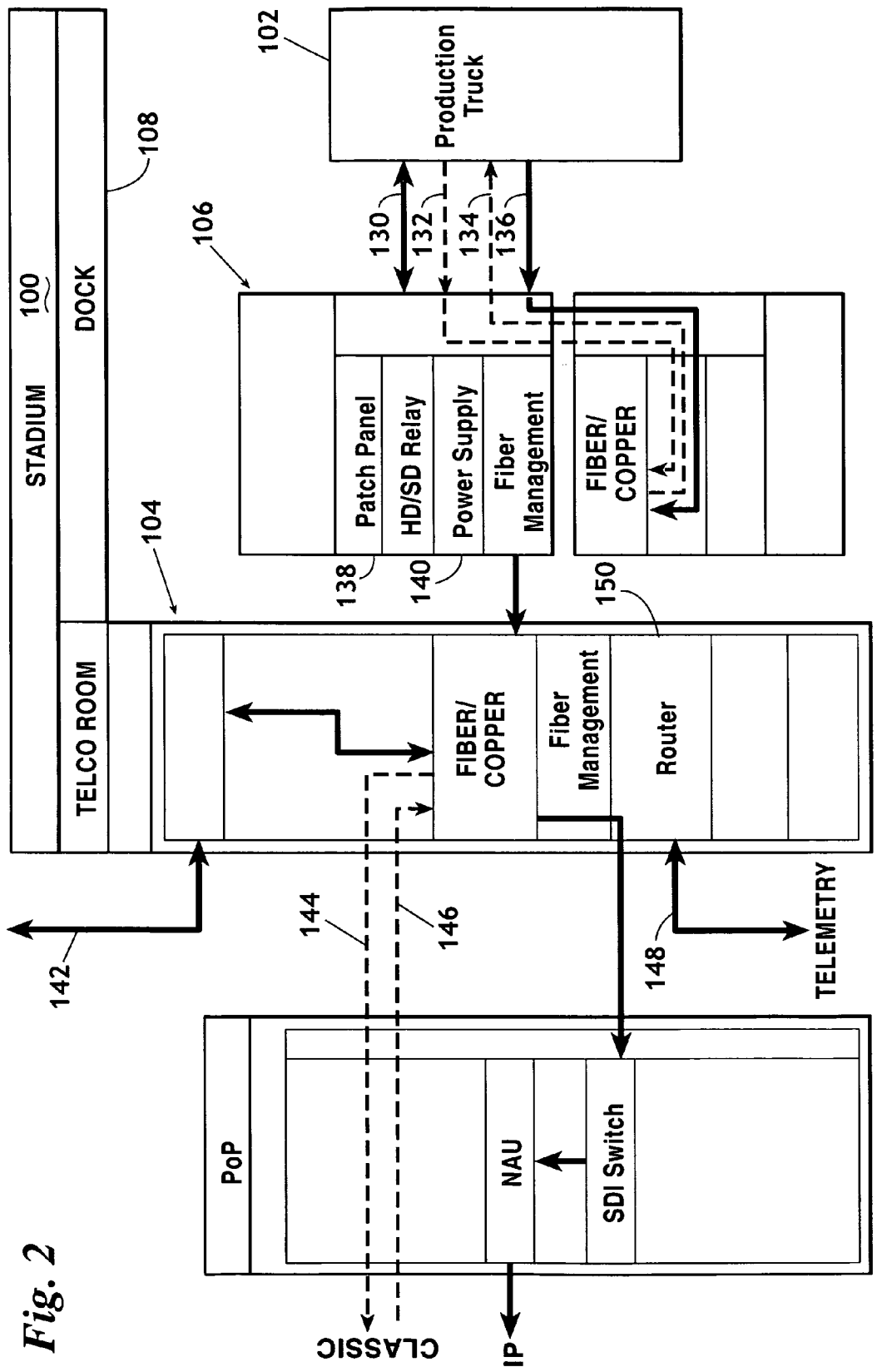
FIG. 2 provides a block diagram of a preferred video management system at a venue.

Next, an SDI switch 28 allows the digital video signal to be switched between redundant paths (not shown) in the event of a failure. From switch 28, the video signal is directed to distribution amplifier 30 for conversion from electrical to optical. With further reference to FIG. 2, the conversion from electrical to optical overcomes distance issues within the venue as the signal is transported from the mezzanine level equipment 106 located at dock 108 to a telecommunication room 104 at the venue 100.

Figure 1B:
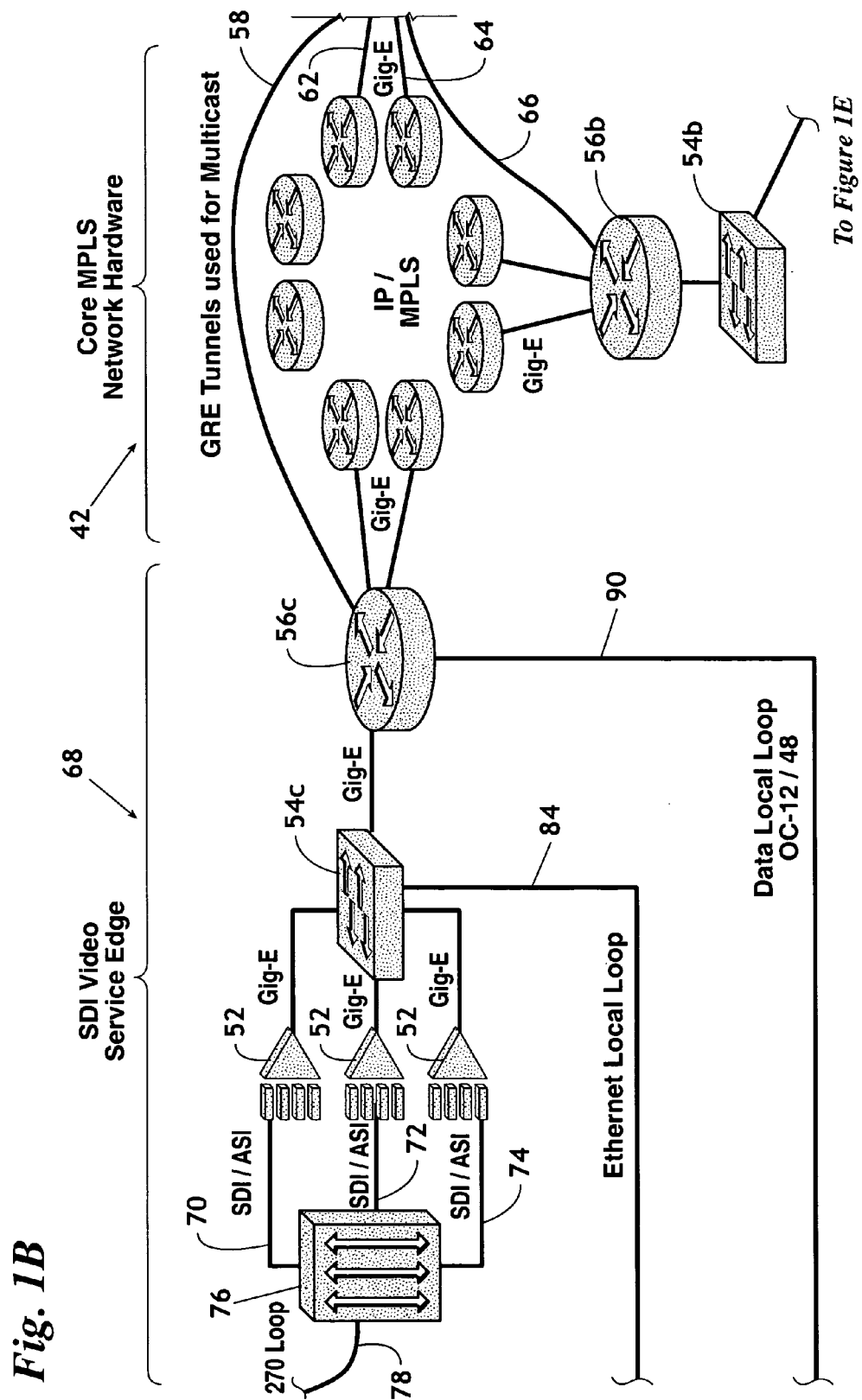
FIG. 1B provides a block diagram of a video service edge at a label egress node in communication with the core MPLS network as employed in the preferred embodiments of the inventive system.
Figure 1C:
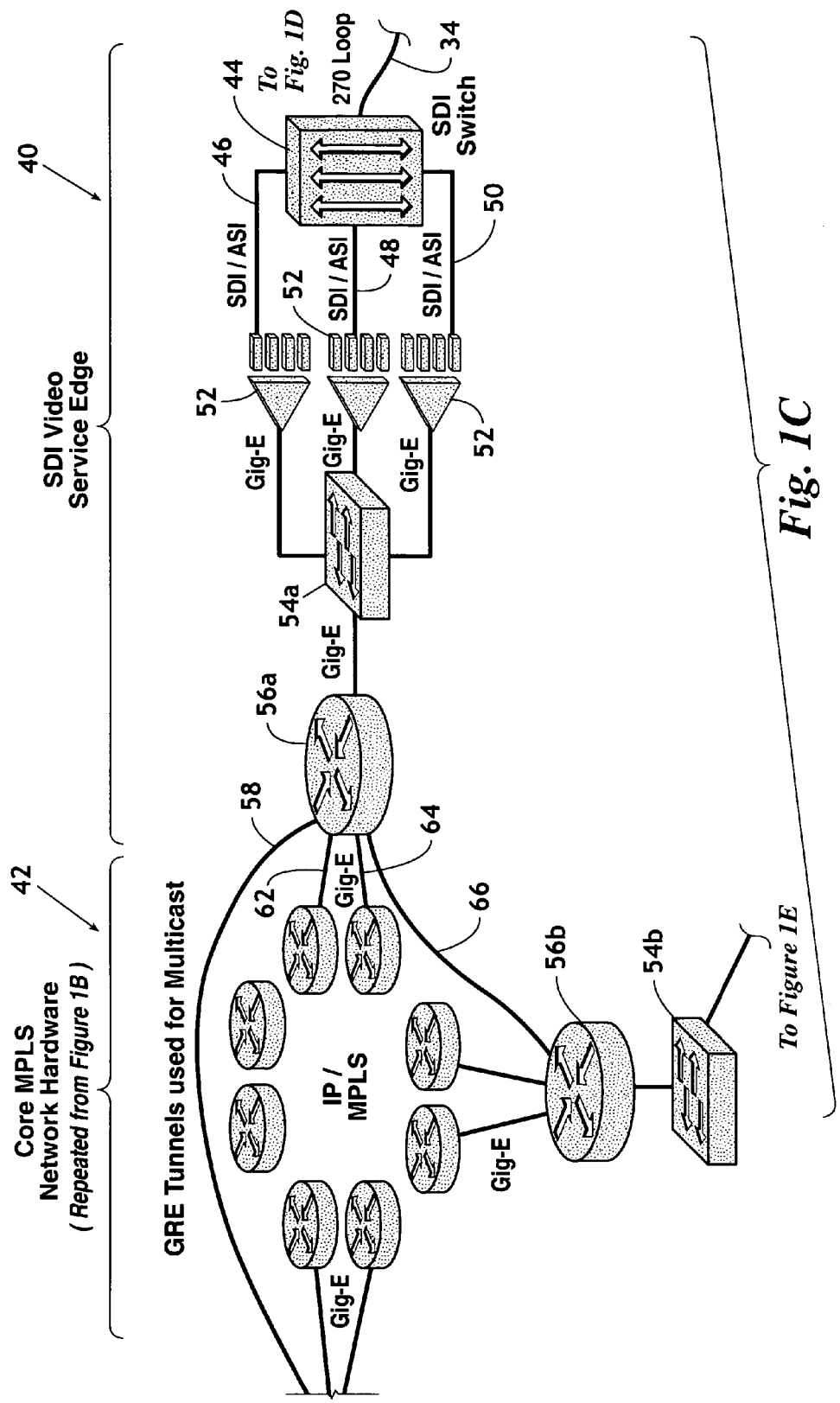
FIG. 1C provides a block diagram of a video service edge at a label ingress node in communication with the MPLS core network as employed in the preferred embodiments of the inventive system.
Figure 1D:
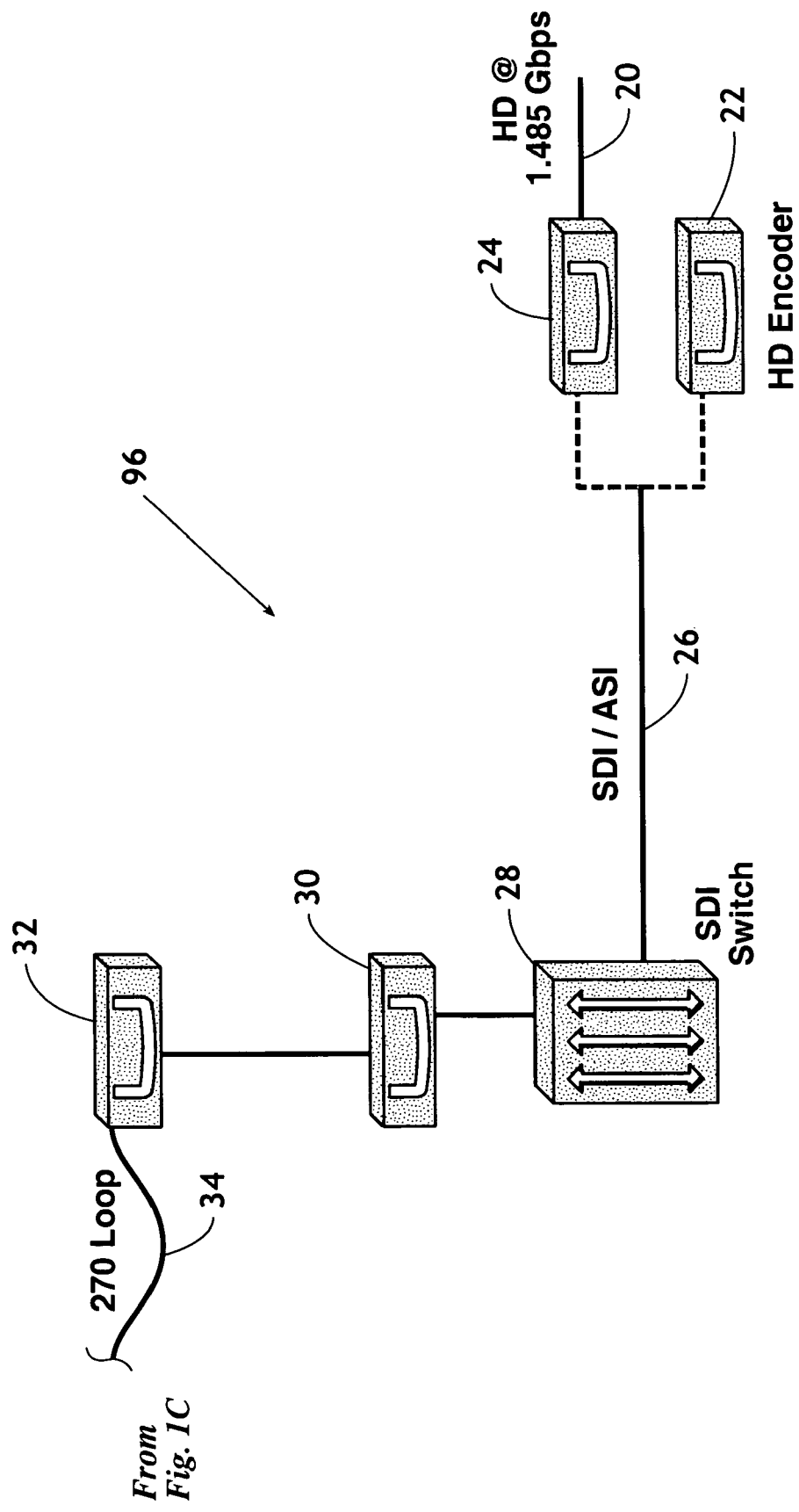
FIG. 1D provides a block diagram of a preferred embodiment of digital video input at a venue.

At the telecommunications room, the signal is converted back from an optical signal to an electrical signal by distribution amplifier 32 and, with further reference to FIG. 1C, transmitted via a 270 Mbps digital loop 34 provided by a local exchange carrier to a fiber network point-of-presence 40. As discussed hereinabove, preferably the fiber network is an MPLS network 42. Thus, in a preferred embodiment the network point-of-presence 40 is a video service edge, which is a specialized label ingress node for the MPLS network.

At video service edge 40, SDI video is delivered to SDI switch 44 which allows video to be switched between redundant paths 46, 48, and 50. Preferably paths 46, 48, and 50 each include a video gateway 52. A video gateway 52 either: receives digital video, i.e. SDI or ASI video, and outputs video formatted in TCP/IP packets; or receives video formatted in TCP/IP packets and outputs video in a selected serial format such as SDI or ASI. At ingress video node 40, video gateway 52 receives serial video data and outputs packetized video data. One such video gateway is the model CX1000 video gateway manufactured by Path 1 Network Technologies, Inc. of San Diego, Calif.

Along each path 46, 48, and 50, from gateways 52 the signals are sent via gigabit ethernet links, or similar high speed network, to router 54a. From router 54a packetized data is sent to label edge router 56a. As discussed above, a label edge router has the responsibility for tagging incoming packets with labels which ultimately determine the route taken through the network by the packet. While in an MPLS network, the destination edge router has the responsibility for initiating the generation of labels for a given route, it is preferable in the inventive system to schedule the routes and generate the routing tables in advance of the televised event. Thus, when video packets arrive at label edge router 56a from gateways 52, router 56a will simply add a predetermined label and pass the packet along the first network hop on network 42. One router capable of operating as a label edge router and suitable for use with the present invention is the model M20 router from Juniper Networks, Inc. of Sunnyvale, Calif.

With further reference to FIG. 1B, wherein the core MPLS network 42 is again shown, the packetized video data can take one or more routes through network 42. For purposes of point-to-multipoint transmission, a generic routing encapsulation ("GRE") tunnel 58 is used to essentially create a private network within the larger network. That is, network traffic along the GRE tunnel 58 is bidirectional and symmetric. To maintain symmetry of network traffic flowing through the GRE tunnel 58 the path of the data flowing through the GRE tunnel 58 in a first direction of transmission is identical to the path data following through the GRE tunnel 58 when the data is transmitted in the opposite direction. In other words, the network, as distinct from its normal operating mode, does not select the path to be followed for data transfers between network nodes. Rather, the data transfer path is preselected, bidirectional and remains fixed of all transmissions of the compressed HD signal (in a data format) between a source location and a destination location in a first direction and between the destination location and the source location in opposite direction of transmission, Accordingly, the GRE tunnel 50 provides the functionality of a private network such that the only path is used by the source and destination location for transmission, in either direction, if compressed HD signals (in data format) is the GRE tunnel 50 making the bidirection transmission of network traffic along the GRE tunnel 50 symmetric. Packets can also be transmitted from the label edge router 56a at the ingress node 40 into the network 42 and routed through the network as normal traffic through connections 62 and 64, keeping in mind that the route is still scheduled and preferably dedicated to the video programming. Still yet, a direct route 66 between label edge router 56a and label edge router 56b may be possible.

Regardless of the routing method employed, packetized video is delivered to video service edge 68, a specialized label egress node, at label edge router 56c. In one preferred embodiment, video at video service edge 68 is handled in a reverse fashion as that of the label ingress node 40 described above. Data is sent to router 54c, directed through redundant paths 70, 72, and 74 to video gateways 52 which receive the TCP/IP packets containing video information and restore the SDI or ASI video signal. Preferably, gateways 52 include a video buffer of sufficient length to eliminate jitter in the outgoing serial data caused by routing delays in network 42. In the preferred embodiment the range of accumulated routing delays can be calculated and/or measured so that the video buffer within gateway 52 can be sized to be no longer than necessary to remove the worst case potential jitter. As will be apparent to those skilled in the art, buffer length has a direct impact on delaying the video signal. Thus the buffer should be of the minimum length required to remove all potential jitter.

From gateways 52 the serial video data is directed to an SDI switch 76 allowing selection of the video from one of paths 70, 72, and 74 for transmission via 270 Mbps loop 78. Like loop 34 (FIG. 1D), 270 Mbps loop 78 is typically supplied by the local exchange carrier. With further reference to FIG. 1A, serial video data is transmitted to a customer facility via loop 78 where a conversion is performed from SDI or ASI to HD at 1.485 Gbps by convertor 80 and optionally converted to optical format in distribution amplifier 82.

In another preferred embodiment, where label edge server 56c is at, or near the customer site, video packets can be delivered from router 54c directly to the customer site via ethernet local loop 84. Packetized video data is then delivered to router 54d, directed to video gateway 52 along path 86, converted from TCP/IP packets to SDI, ASI, or the like, in gateway 52 and restored to HD at 1.485 Gbps in decoder 88.

In still another preferred embodiment, an optical fiber 90 connects the fiber network with the customer site. Data is then routed from router 56c to router 56e. It should be noted that two options are available. First, router 56c can remain the label egress node, strip the label from outbound packets and deliver data to router 56e as TCP/IP packets. Alternatively, router 56e can become the label egress node, receive MPLS packets from router 56c and locally convert the packets back to TCP/IP. Either way, TCP/IP packets are delivered to router 54*e*, and directed to gateway 52 along path 92. Within gateway 52 the packetized data is restored to an SDI or ASI data stream and directed to decoder 94. An HD data stream at 1.485 Gbps is then provided to the customer.

Figure 1E:
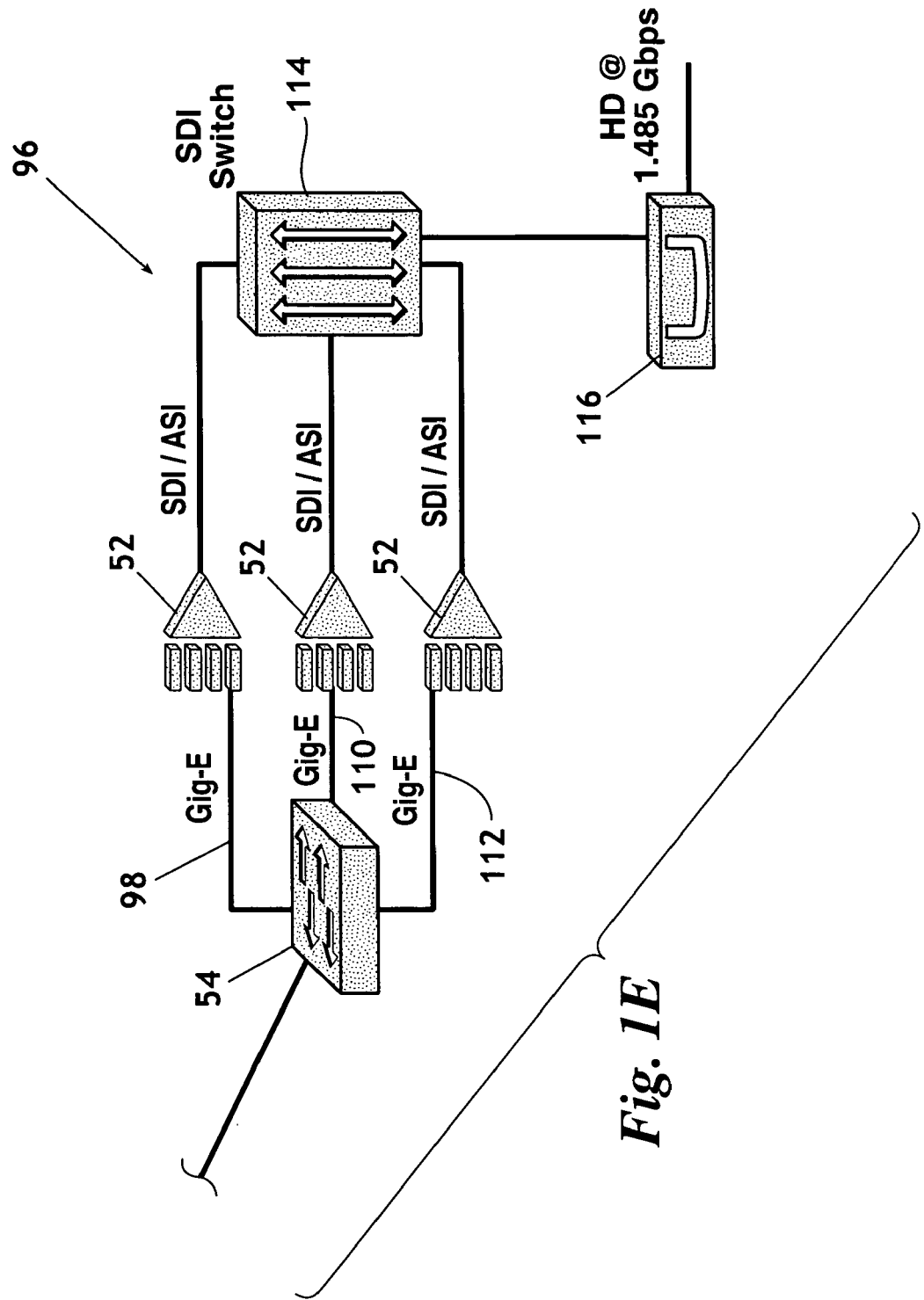
FIG. 1E provides a block diagram of an egress node at a television operations center.

Turning next to FIGS. 1B and 1E, in many cases it is desirable to simultaneously deliver the signal to a network operator's television operations control facility 96. As will be apparent to those skilled in the art, video packets are simply routed to label edge router 56*b* where label information is removed from the packet and the original TCP/IP packet is delivered to router 54*b*. From router 54*b*, data is sent to router 54*f* and forwarded to video gateways 52 along paths 98, 110, and 112. As before, gateways 52 restore the original serial video data stream, i.e. SDI, ASI, or the like, from the received TCP/IP packets. Data is then switched via SDI switch 114 and converted from SD to HD in decoder 116.

It should be noted that the system for the delivery of HD signals described above is capable of bidirectional operation. Thus, for example, at a customer site commercials may be added it the original signal, and re-transmitted via the MPLS network back to other video service edges on the network. In such a configuration, a video service edge, i.e. edge 68, may be a label egress node with respect to the original program and a label ingress node with respect to the fully produced program. Thus, at the customer site shown in FIG. 1A for example, path 118 could supply SDI video to gateway 52 which packetizes the signal and forwards it to video service edge 68 via router 54*d*.

It should also be noted that, in terms of point-to-multipoint operation, GRE tunnel 58 is preferably symmetric in nature, network traffic in one direction follows exactly the same route as network traffic in the opposite direction. While necessary for point-to-multipoint operation, an added benefit is that network delays and jitter are substantial the same in either direction of operation.

It should also be noted that inherent in an MPLS architecture is the ability to schedule routes in advance of the actual data flow through the network. In terms of high value programming, this allows the provisioning of network resources well in advance, allowing the network operator to ensure routes are actually available for a specific event.

Turning next to FIG. 2, in a typical configuration, a production truck 102 is parked at a stadium in an area reserved for television production equipment 108. Within 300 feet of truck 102, the practical limit for coax transmission of HDTV, mezzanine level equipment 106 is provided to support the production truck 102. Typically between truck 102 and support equipment 106 there will be: one or more conventional analog telephone lines 130 for IFB or engineering management from the customer facility; SDTV transmit line 132 for support of SD and analog broadcasting; SDTV receive line 134 for receiving fully produced video back from the customer site; and HDTV transmit line 136 for sending HDTV via the inventive system.

At the mezzanine level equipment 106 an RJ-11 panel 138 is provided for management of the telephone lines, a power supply 140 for operation of equipment; and data and fiber management as described above. From the mezzanine level equipment 106 information is passed to telco room 104 via fiber to overcome the 300 foot limitation of copper coax.

At room 104, POTS lines 142 are connected to the switched telephone public network, standard television transmit and receive lines, 144 and 146, respectively, are handled in the conventional manner through a local loop provided by the local exchange carrier, and control of the system is provided by network connection 148 directed to router 150. HDTV is directed from telco room 104 to the fiber network point-of-presence in the manner described above.

As will be apparent to those skilled in the art, using the venue system described above, the conventional broadcast is backed up by the HD broadcast in the event the classic link fails, and the broadcaster can always fall back to SD if the HD system fails. As will also be apparent to those skilled in the art, the HD signal is never analog, delivery of the HD video is digital end-to-end. In contrast, presently analog video is sent from the venue to the network point-of-presence where digitization now occurs.

Figure 3:
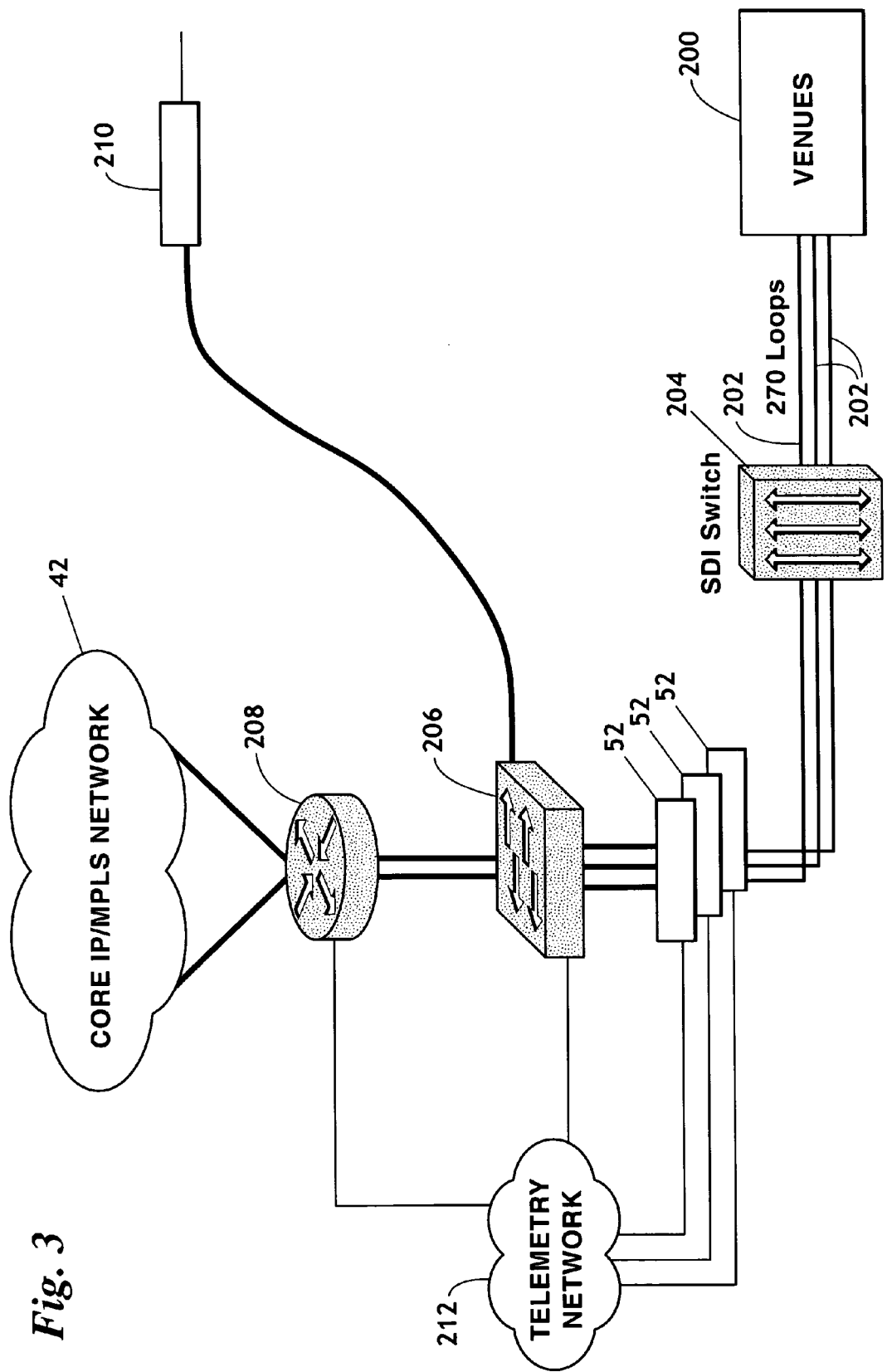
FIG. 3 provides a block diagram of redundant systems in a label ingress node.

With reference to FIG. 3, in most cities there are more than one venue which host events which are likely to be televised. A feature of the inventive system is that infrastructure is maximized at, and between, video service edges and minimized at the individual venues. In light of this feature, multiple venues 200 are each served by individual 270 Mbps loops 202. A single SDI switch 204 can be used at the video service edge to enable video distribution from any given venue only during an event. From switch 204, SDI signals are individually packetized at gateways 52 and sent to router 206 and, in turn, to label edge router 208 and MPLS network 42. End-to-end control of the system is accomplished via telemetry network 212, which may, in fact, be a subset of MPLS network 42. It should also be noted that from a video service edge, monitoring can be accomplished by directing packets from a selected source to gateway 210 which then provides serial video data.

As will be apparent to those skilled in the art, while some compression of the HD signal is necessary to perform the HD/SD conversion to 270 Mbps to accommodate the local loop and video gateway, the level of compression required is relatively small, particularly in light of the fact that the data rate is over twice that available from a satellite transponder.

Thus, providing a multicast transmission of HD video with the inventive system involves: converting the signal from HD data rates to SD data rates; converting the signal to optical for transmission within the venue; converting the signal back to electrical for transmission over a 270 Mbps loop, typically provided by the local exchange carrier from the venue to a video service edge; converting from a continuous data stream (SDI) to TCP/IP packets in video gateway; converting the electrical signal to optical; transmitting the packets over a fiber network in a multicast environment; receiving the packets at one or more video service edges; converting the packets from optical to electrical; converting from TCP/IP packets to a continuous serial data stream in a video gateway; decompressing the signal from SD data rates to HD data rates; and delivering an HD signal to a customer.

Preferably, the transmission of packets over a fiber network includes tagging each packet with a label containing routing information and transmitting the packet over an MPLS fiber network.

Optionally, the packets are transmitted via a GRE tunnel in a point-to-multipoint fashion.

It should be noted that while the preferred embodiments were described with reference to an MPLS fiber network, the present invention is neither limited to MPLS networks or fiber networks. In fact many types of networks are suitable for use with the present invention, whether electrical, optical, wireless, or otherwise, and many protocols can be employed with regard to practicing the present invention and at various network layers. Thus, by way of example and not limitation, the present invention may be practiced in ATM networks, IP networks, and the like, and such networks are within both the scope and spirit of the present invention.

It should also be noted that the term "label edge router" is used with reference to the preferred embodiments which employs an MPLS network. It is contemplated that when other types of networks are used, routers appropriate for use with the specific network will also be used. Thus, the term "router" is to interpreted broadly to include not only label edge routers but also to include any type of network router, switch, or the like.

It should be further noted that, while the preferred embodiments are described with reference to 270 Mbps loops, the invention is also not so limited. As will be recognized by those skilled in the art, any number of solutions may be available for digital communications between a venue and the video service edge and any such solution, regardless of the data rate supported, is within the scope and spirit of the present invention. By way of example and not limitations, other available digital links may include: fiber optic, coax, twisted pair, a modulated laser beam, microwave or other RF link, etc.

Finally, with regard to the mezzanine level equipment, it should be noted that the preferred embodiment is discussed in the general environment of a sports arena, stadium, or the like. As will be apparent to those skilled in the art, the precise configuration of the venue-side equipment, as depicted in FIG. 2, will depend on the environment in which it is used, the type of facility, the distance between production equipment and telecommunication facilities, etc. It is contemplated that adaptations of the venue-side equipment to accommodate the local environment are likewise within the scope and spirit of the present invention.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

The invention claimed is:

1. A method for transmitting an HD signal from a source location to a destination location comprising the steps of:
   (a) at the source location, receiving the HD signal from a video source at an HD data rate;
   (b) compressing said HD signal at said HD data rate to create a compressed HD signal having a data rate not greater than an SD data rate, wherein said HD signal and said compressed HD signal are digital signals;
   (c) transmitting said compressed HD signal from source location to a first network point-of-presence;
   (d) in a first video gateway, converting said compressed HD signal into data formatted for transmission via a data network;
   (e) transmitting said data to a second network point-of-presence;
   (f) in a second video gateway converting said data into said compressed HD signal;
   (g) decompressing said compressed HD signal into a destination HD signal at said HD data rate; and
   (h) delivering said destination HD signal at the destination location.

2. The method for transmitting said HD signal from said source location to said destination location of claim 1 wherein said first and said second network points-of-presence are video service edges, and further wherein the transmitted data is transmitted between said first and said second video service edges through a GRE tunnel, wherein the GRE tunnel is a bidirectional and symmetric path through said data network.

3. The method for transmitting said HD signal from said source location to said destination location of claim 2 further comprising: (k) transmitting TCP/IP packets containing a return video program through said GRE tunnel from said second point-of-presence to said first point-of-presence.

4. The method for transmitting said HD signal from said source location to said destination location of claim 1 wherein said data formatted for transmission via a network is formatted as TCP/IP packets.

5. The method for transmitting said HD signal from said source location to said destination location of claim 4 wherein said data network is an MPLS network and said first point-of-presence comprises a first label edge router and said second point of presence comprises a second label edge router and wherein said data formatted for transmission further comprises tagging said TCP/IP packets with a label in said first label edge router, said label defining said route between said first point-of-presence and said second point-of-presence.

6. The method for transmitting said HD signal from said source location to said destination location of claim 5 wherein said route is defined and reserved according to a schedule prior to performing step(a).

7. The method for transmitting said HD signal from said source location to said destination location of claim 4, wherein said TCP/IP packets are transmitted in a point-to-multipoint fashion to a plurality of label edge routers.

8. The method for transmitting said HD signal from said source location to said destination location of claim 1, wherein said second video gateway comprises a video buffer, and wherein delivering said destination HD signal at the destination location further comprises (i) in a second video gateway converting said destination HD signal into said compressed HD signal at said SD data rate; and (h)(ii) buffering said compressed HD signal in said buffer to remove jitter from said compressed HD signal.

9. The method for transmitting said HD signal from said source location to said destination location of claim 1, wherein said data network is a fiber network.

10. A system for the end-to-end digital transmission of a video signal comprising:
   a mezzanine level system comprising:
      an encoder for compressing an HD signal at a first data rate to an SDI data stream at a second data rate; and
      a first converter for converting said SDI data stream to an optical signal;
   a fiber optic link connecting a second converter for converting said optical signal back to said SDI data stream;
   a first video service edge comprising:
      an SDI switch for receiving said SDI data stream, said SDI switch connected to said second converter through a 270 Mbps loop;
      a first video gateway in communication with said SDI switch for receiving said SDI data stream, wherein said SDI data stream is configured by said first video gateway into packets output through a gateway network connection; and
      a first router in communication with said first gateway network connection to receive said packets and retransmit said packets via a GRE tunnel of a data network, wherein the GRE tunnel is a bidirectional and symetric path through said data network; and
   a second video service edge comprising:
      a second router, said second router receiving said packets from said data network and outputs said packets through a router output; and
      a second video gateway in communication with said router output to receive said packets, wherein said second video gateway converts said packets to restore said SDI data stream through a gateway digital output;
a decoder for decompressing said SDI data stream into an uncompressed HD signal at said first data rate, said decoder in communication with said gateway digital output for receiving said SDI data stream.

11. The system for the end-to-end digital transmission of the video signal of claim 10 wherein said decoder is located at a customer site and said decoder is in communication with said gateway digital output through a 270 Mbps loop.

12. The system for the end-to-end digital transmission of the video signal of claim 10 wherein said second video gateway is located at a customer site and said second video gateway is in communication with said router output through an Ethernet switch loop or Ethernet local loop.

13. The system for the end-to-end digital transmission of the video signal of claim 10 wherein said second video service edge is located at a customer site.

14. The system for the end-to-end digital transmission of the video signal of claim 10 wherein said packets are TCP/IP packets.

15. The system for the end-to-end digital transmission of the video signal of claim 10 wherein said data network is an MPLS network and said first and said second routers are label edge routers.

16. The system for the end-to-end digital transmission of the video signal of claim 15 wherein said MPLS network is a fiber network.

17. A system for preparing a plurality of HD signals for transmission over a data network, the plurality of HD signals originating from a plurality of venues, the system comprising:
a plurality of encoders for compressing said plurality of HD signals into a corresponding plurality of compressed HD signals, each encoder being associated with one venue of said plurality of venues, wherein each of the corresponding plurality of compressed HD signal is at a data rate not greater than an SD data rate, and in which said HD signals and said compressed HD signals are digital signals;
a plurality of local digital loops, each local digital loop being in communication with a corresponding encoder of said plurality of encoders for carrying the compressed HD signal of said corresponding encoder;
an SDI switch having a plurality of SDI inputs in communication with said plurality of encoders through said plurality of local digital loops, said SDI switch having an SDI output for selectively outputting an individual compressed HD signal selectected from said corresponding plurality of compressed HD signals;
a video gateway in communication with said SDI switch to receive said individual compressed HD signal, wherein said individual compressed HD signal is configured by said video gateway into data packets output through a gateway network connection; and
a router in communication with said gateway network connection to receive said data packets and retransmit said data packet over a data network.

18. The system for preparing the plurality of HD signals for transmission over the data network of claim 17 wherein said data network is an MPLS network and said router is a label edge router.

19. A system comprising:
a mezzanine level system comprising:
an encoder configured to compress an HD video signal at a first data rate to a data stream at a second data rate, said second data rate being lower than said first data rate and not greater than an SD data rate, wherein said HD video signal and said data stream are digital signals; and
a communications device configured to transmit the data stream onto a local loop;
a first video service edge site comprising:
a switch in communication with the local loop thereby configured to receive said data stream transmitted by the communication device;
a first video gateway in communication with said switch thereby configured to receive said data stream, wherein said first video gateway is configured to convert said data stream into packets and output said packets through a first gateway network connection; and
a first router in communication with said first gateway network connection thereby configured to receive said packets therefrom and retransmit said packets via a data network; and
a second video service edge site comprising:
a second router, said second router configured to receive said packets from said data network and output said packets through a router output; and
a second video gateway in communication with said router output thereby configured to receive said packets therefrom, wherein said second video gateway is configured to convert said packets to restore said data stream and output said data stream through a gateway digital output;
a decoder in communication with said gateway digital output thereby configured to receive said data stream therefrom, said decoder configured to decompress said data stream to restore the HD video signal at said first data rate.

20. A system as recited in claim 19, wherein said decoder is located at a customer site and said decoder is in communication with said gateway digital output through a local loop.

21. A system as recited in claim 19, wherein said second video gateway is located at a customer site and said second video gateway is in communication with said router output through an Ethernet switch loop or Ethernet local loop.

22. A system as recited in claim 19, wherein said packets are TCP/IP packets.

23. A system as recited in claim 19, wherein said data network is an MPLS network and said first and said second routers are first and second label edge routers, respectively.

24. A system as recited in claim 23, wherein said MPLS network is a fiber network.

25. A system as recited in claim 19, wherein said local loop is a 270 Mbps loop.

26. A system as recited in claim 19, wherein the data stream is in SDI format, said first switch being an SDI switch.

27. A system as recited in claim 19, wherein the data stream is in ASI format, said first switch being an ASI switch.

28. A system as recited in claim 19, wherein said first data rate is at least 1.4 Gpbs.

29. A system as recited in claim 19, wherein the mezzanine level system comprises:
a first converter configured to convert the data stream to an optical signal;
a fiber optic link communicatively connecting said first converter to a second converter, wherein the second converter is configured to receive the optical signal from the first converter via the fiber optic link and reconvert the optical signal to the data stream, and wherein the second converter is communicatively connected to the local loop and configured to transmit the reconverted data stream thereon for communication to the switch at the first video service edge site.

30. A system for the end-to-end digital transmission of a video signal comprising:
 a mezzanine level system comprising:
  an encoder for compressing an HD signal at a first data rate to a data stream at a second data rate not greater than an SD data rate, wherein said HD signal and said data stream are digital signals; and
  a first converter for converting said data stream to an optical signal; a fiber optic link connecting a second converter for converting said optical signal back to said data stream;
 a first video service edge comprising:
  a switch for receiving said data stream, said switch connected to said second converter through a local loop;
  a first video gateway in communication with said switch for receiving said data stream, wherein said data stream is configured by said first video gateway into packets output through a gateway network connection; and
  a first router in communication with said first gateway network connection to receive said packets and retransmit said packets via a data network; and
 a second video service edge comprising:
  a second router, said second router receiving said packets from said data network and outputs said packets through a router output; and
  a second video gateway in communication with said router output to receive said packets, wherein said second video gateway converts said packets to restore said data stream through a gateway digital output;
  a decoder for decompressing said data stream into an uncompressed HD signal at said first data rate, said decoder in communication with said gateway digital output for receiving said data stream.

31. The system for the end-to-end digital transmission of the video signal of claim 30, wherein said decoder is located at a customer site and said decoder is in communication with said gateway digital output through a local loop.

32. The system for the end-to-end digital transmission of the video signal of claim 30, wherein said second video gateway is located at a customer site and said second video gateway is in communication with said router output through an Ethernet switch loop or Ethernet local loop.

33. The system for the end-to-end digital transmission of the video signal of claim 30, wherein said second video service edge is located at a customer site.

34. The system for the end-to-end digital transmission of the video signal of claim 30, wherein said packets are TCP/IP packets.

35. The system for the end-to-end digital transmission of the video signal of claim 30, wherein said data network is an MPLS network and said first and second routers and first and second label edge routers, respectively.

36. The system for the end-to-end digital transmission of the video signal of claim 35, wherein said MPLS network is a fiber network.

* * * * *